(12) United States Patent
Kleefstra (10) Patent No.: US 7,499,821 B2
(45) Date of Patent: Mar. 3, 2009

(54) SENSOR DRIFT CHARACTERISTIC TESTING

(75) Inventor: Meindert J. Kleefstra, Vancouver, WA (US)

(73) Assignee: AirAdvice, Inc., Portland, OR (US)

( * ) Notice: Subject to any disclaimer, the term of this patent is extended or adjusted under 35 U.S.C. 154(b) by 363 days.

(21) Appl. No.: 11/336,293

(22) Filed: Jan. 20, 2006

(65) Prior Publication Data

US 2007/0169538 A1    Jul. 26, 2007

(51) Int. Cl.
*G01D 3/00* (2006.01)
*G01D 1/00* (2006.01)
(52) U.S. Cl. .................. 702/116; 73/1.01; 73/1.06
(58) Field of Classification Search ............ 73/1.01, 73/1.06; 702/116
See application file for complete search history.

(56) References Cited

U.S. PATENT DOCUMENTS

| | | | | |
|---|---|---|---|---|
| 4,154,672 A | * | 5/1979 | Wiley et al. .................. 378/89 |
| 4,807,161 A | * | 2/1989 | Comfort et al. .............. 702/121 |
| 4,916,570 A | * | 4/1990 | Dale ........................... 361/86 |
| 5,766,432 A | * | 6/1998 | Dunn et al. .................. 204/412 |
| 6,850,859 B1 | | 2/2005 | Schuh | |
| 7,346,469 B2 | * | 3/2008 | Taware et al. ............... 702/179 |
| 2008/0067341 A1 | * | 3/2008 | Davenport et al. .......... 250/282 |

\* cited by examiner

*Primary Examiner*—Thomas P Noland
(74) *Attorney, Agent, or Firm*—Schwabe, Williamson & Wyatt, P.C.

(57) ABSTRACT

Embodiments of apparatuses, articles, methods, and systems for measuring sensor drift characteristics are generally described herein. In some embodiments, a system having a sensor platform to receive a sensor and measure drift characteristic of the sensor is disclosed. The system may further include a data acquisition device coupled to the sensor platform to receive the measured drift characteristic and to compare them to acceptance criteria in order to determine an acceptability of the sensor. Other embodiments may be described and claimed.

10 Claims, 6 Drawing Sheets

SENSOR DRIFT CHARACTERISTIC TESTING

FIELD

Embodiments of the present invention relate generally to the field of sensors, and more particularly to sensor drift characteristic testing.

BACKGROUND

Sensors, in general, are devices used to detect physical stimuli such as heat, particulates, chemicals, gasses, etc. and output a signal that may be used to quantify the stimuli. Over time, a sensor's response to stimuli may change, which may in turn affect the accuracy of any quantification based on the output signal.

In order to account for this change in sensor response, sensor manufacturers typically provide specifications having a relatively wide range of operating parameters so that, even after the change, the sensor will most likely still be in the range. However, knowing that a sensor is operating within this operating parameter range may not be sufficient for a user of the sensor who may have calibrated the sensor based on a pre-change response curve.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Illustrative embodiments of the present invention may include analysis of sensor drift characteristics as a sensor performance metric.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language which may be used in connection with various embodiments, the phrase "A/B" means "A or B." The phrase "A and/or B" means "(A), (B), or (A and B)." The phrase "at least one of A, B, and C" means "(A), (B), (C), (A and B), (A and C), (B and C), or (A, B, and C)." The phrase "(A)B" means "(B) or (A and B)," that is, A is optional.

Figure 1:
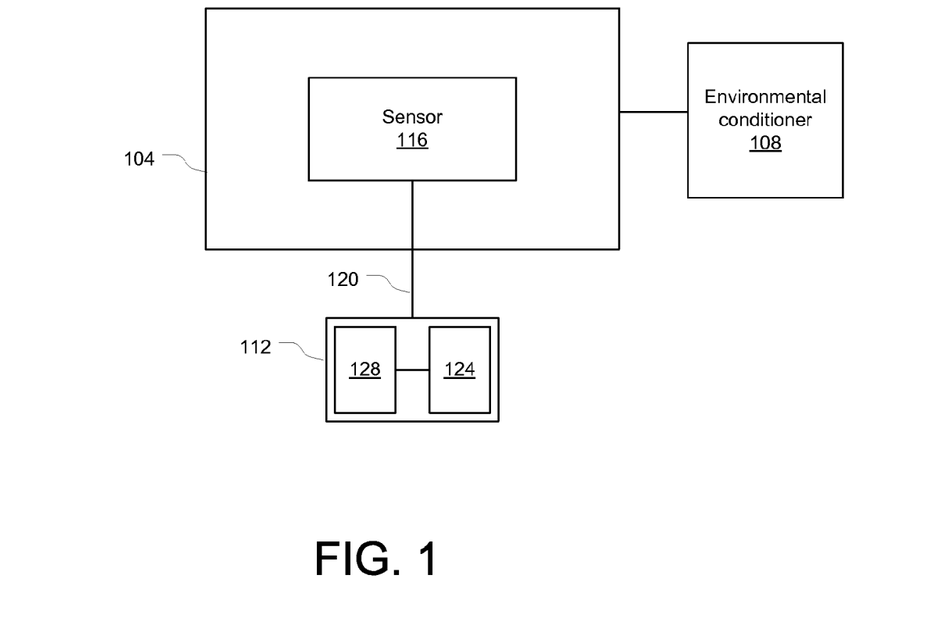
FIG. 1 illustrates a sensor testing facility in accordance with an embodiment of the present embodiment.

FIG. 1 illustrates a sensor testing facility 100 in accordance with an embodiment of the present invention. The sensor testing facility 100 may include a chamber 104 to provide an environment having controllable levels of a physical stimulus. The levels of the physical stimulus may be controlled by an environmental conditioner 108 coupled to the chamber 104. The sensor testing facility 100 may also have a data acquisition device 112 to couple to a sensor 116 disposed within the chamber 104 and to record a signal output from the sensor 116 based on the stimulus. The output signal from the sensor 116 may be conveyed to the data acquisition device 112 via a communication link 120. In some embodiments, the sensor 116 may be coupled to a sensor platform to facilitate the operating state of the sensor 116 and/or the communications to and/or from the data acquisition device 112.

In some embodiments, the environmental conditioner 108 may vary the stimulus in a predetermined manner over time. The output may be recorded and analyzed to determine acceptability of the sensor 116 based at least in part on measured drift characteristics.

In some embodiments, drift characteristics such as settling drift, sensitivity drift, and/or output drift may be focused on as an indication of the potential field performance of a sensor. The analysis of these particular drift characteristics prior to field implementation may facilitate a more reliable identification of underperforming sensors. Analysis of a sensor's drift characteristics may be described in further detail below in accordance with embodiments of the present invention.

In various embodiments, the data acquisition device 112 may include one or more processor(s) 120 and data storage 124. The data storage 124 may include various combinations of volatile, non-volatile, removable and/or non-removable memory structures. In some embodiments, the data storage 124 may include one or more structure(s) integrated within the processor(s) 120, e.g., a processor-level cache. The data storage 124 may provide storage of historical data of the output signal as well as programming instructions for execution by the processor(s) 120 to enable data acquisition device 112 to perform various operations, some of which may be described herein.

In some embodiments, the data acquisition device 112 may be a general purpose computing device, e.g., a laptop computing device, a desktop computing device, and the like. In some embodiments, the data acquisition device 112 may be a specific-computing device designed to perform a limited number of functions directed to a particular application.

In an embodiment, the sensor 116, which may be a metal-oxide semiconductor (MOS) sensor, may respond to stimuli such as volatile organic compounds (VOCs) and may therefore be referred to as a VOC sensor. However, in other embodiments, other types of sensors may be evaluated in a manner described by the embodiments of the present invention. Other types of sensors may be particularly adapted to detect, e.g., temperature, pressure, fluid flow, various chemicals (either specific chemicals, e.g., carbon dioxide, carbon monoxide and/or radon or classes of chemicals, e.g., VOCs, etc.), particulates, and so forth.

Figure 2:
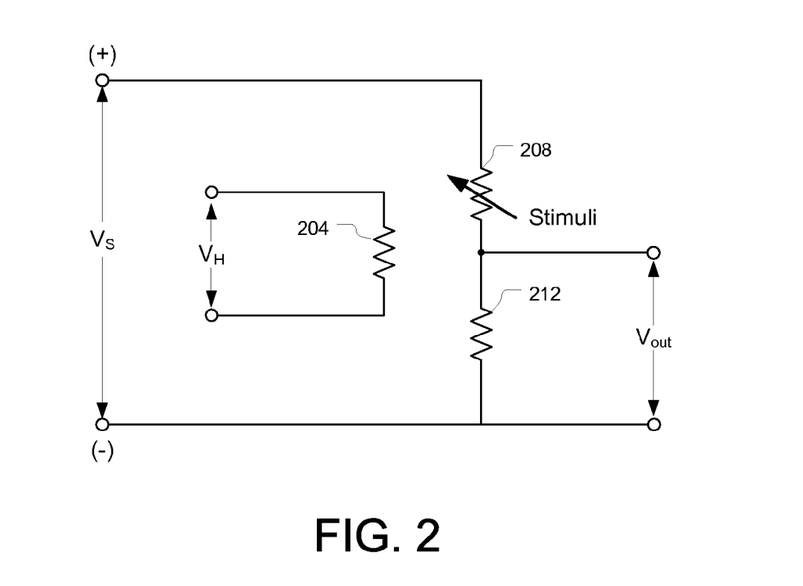
FIG. 2 illustrates a sensor circuit in accordance with an embodiment of the present invention.

FIG. 2 illustrates a schematic of the sensor 116, in accordance with an embodiment of the present invention. The sensor 116 may include a heater resistor 204, a sensor resistor 208 and a load resistor 212 coupled to each other as shown. A heater voltage $V_H$ may be applied to the terminals of the heater resistor 204 to provide an operating temperature for the sensor resistor 208. A sensor voltage $V_S$ may be applied over the series of the sensor resistor 208 and the load resistor 212. The heater voltage $V_H$ and the sensor voltage $V_S$ may be provided by the same power supply circuit. The sensor resistor 208 may be a variable resistor having a resistance that changes proportional to the amount of a stimulus, e.g., VOC, present. An output voltage $V_{out}$ may be measured across the load resistor 212, having a resistance $R_L$, and the resistance $R_S$ of the sensor resistor 208 may then be calculated based on the $V_S$. The resistance $R_S$ may be computed through the following equation:

$$R_s = R_L \frac{(V_S - V_{out})}{V_{out}}. \quad \text{Eq. 1}$$

Figure 3A:
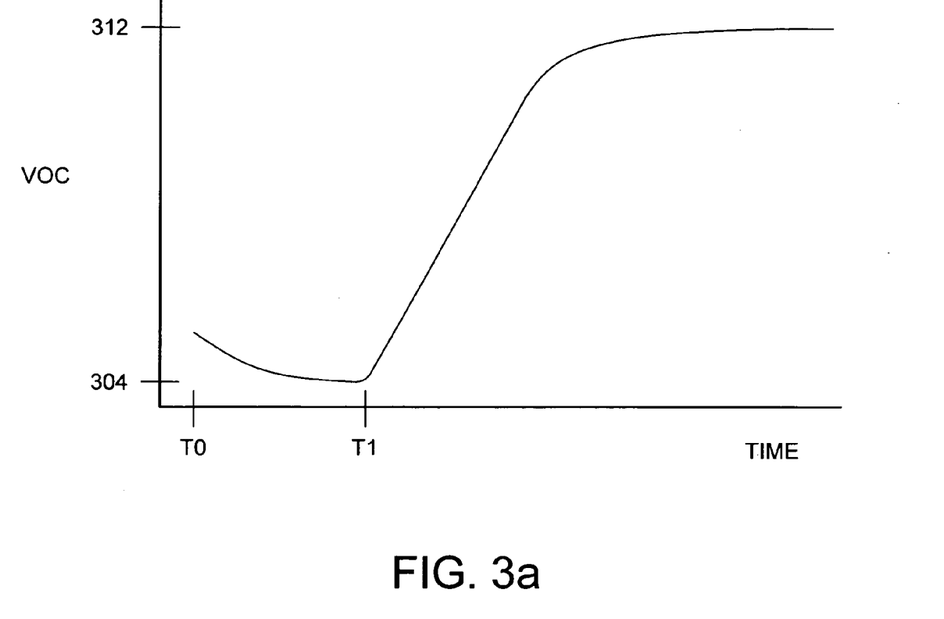
FIG. 3a illustrates a graph representing a test environment as a function of time, in accordance with an embodiment of the present invention.
Figure 3B:
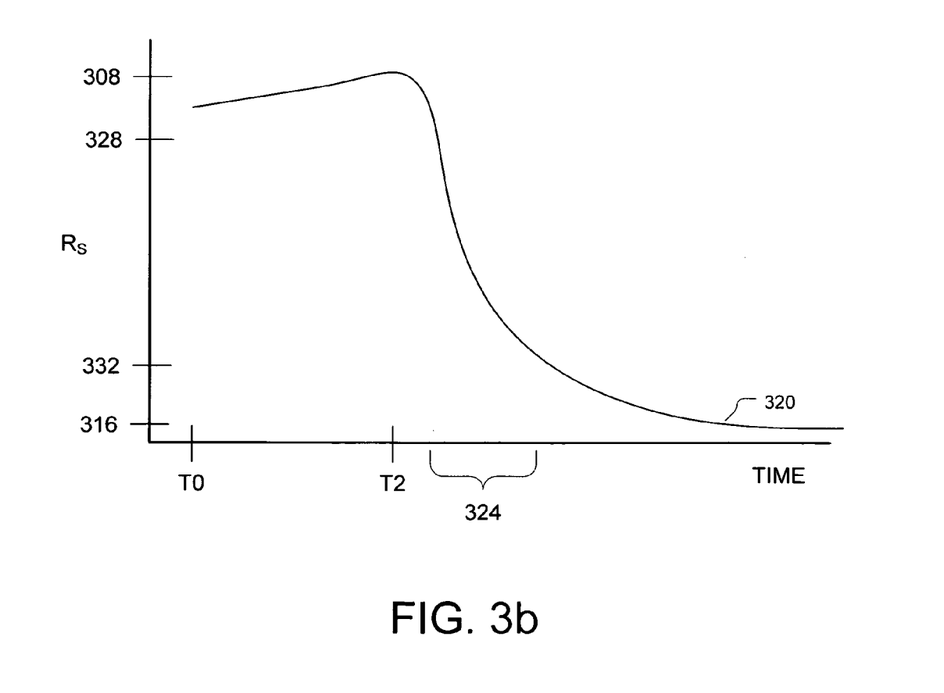
FIG. 3b illustrates a graph representing a sensor output signal curve as a function of time corresponding to the test environment described by FIG. 3a in accordance with an embodiment of the present invention.
Figure 4:
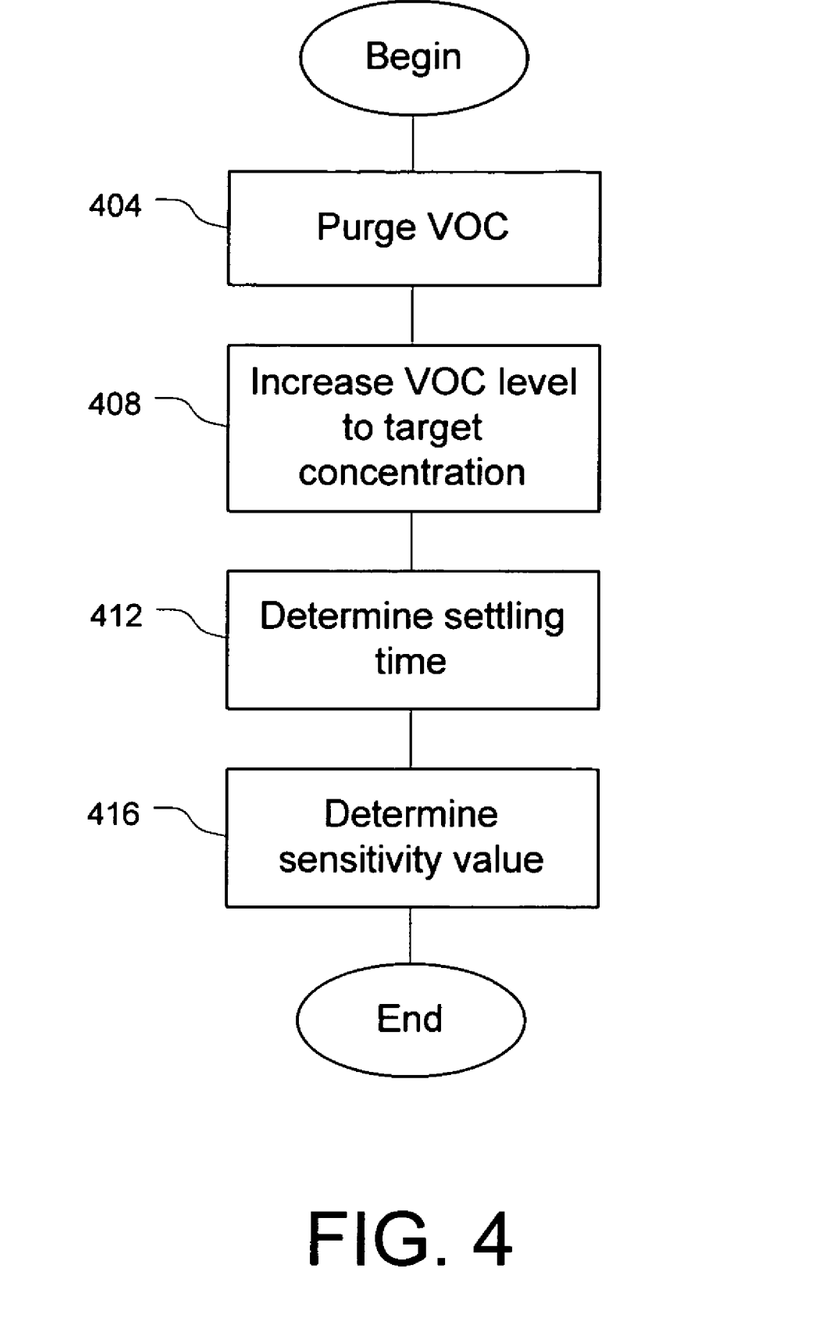
FIG. 4 illustrates operational phases of a sensor analysis iteration in accordance with an embodiment of the present invention.

FIGS. 3a-3b respectively illustrate a graph representing the varying VOC levels within the chamber 104 over time and a graph of an output resistance of the sensor resistor 208 disposed within the chamber 104 as they gradually respond to a change in the VOC level in accordance with an embodiment of the present invention. Furthermore, FIG. 4 illustrates phases of a sensor analysis operation in accordance with an embodiment of the present invention. Operational phases may be noted by reference numerals in parentheses.

At an initial time T0 the environmental conditioner 108 may begin to purge the chamber 104 of VOCs until time T1 (404), which may result in a locally low VOC level 304. As can be seen, the sensor resistance $R_S$ may be inversely proportional to the VOC levels. Therefore, from time T0 to time T1, as the VOC level decreases to a relative low point, e.g., low VOC level 304, the sensor resistance $R_S$ may increase to a relative high point, e.g., high sensor resistance 308. In some embodiments the purge of the VOCs may be done gradually enough such that the sensor resistance $R_S$ does not exhibit any response delay.

In some embodiments, the chamber 104 may be kept at approximately the low VOC level for a period to allow the output of the sensor 116 to increase to a stable value. After the time period, the environmental conditioner 108 may introduce a sufficient quantity of VOCs to result in a targeted high-VOC level 312 within the chamber 104, e.g., 1 part per million (ppm) of isobutylene (408). Likewise, the sensor resistance $R_S$ may show a corresponding drop to a low sensor resistance 316.

The response curve 320 shown in FIG. 3b may be recorded and analyzed for attributes, such as settling time (412) and sensitivity values (416), which may be used in determination of drift characteristics.

In some embodiments, the settling time of the response curve 320 may be determined by measuring a settling time 324 between an occurrence of an upper value 328 of the resistance and a lower value 332 of the resistance. In an embodiment, the upper value 328 and lower value 332 used for the calculation of the settling time 324 may be values inside of the high resistance 308 and low resistance 316. For example, in an embodiment the upper value 328 may be when the sensor resistance $R_S$ has dropped approximately 10% of the total resistance change from the high resistance 308 and the lower value 332 may be when the resistance has dropped approximately 90% of the total resistance change from the high resistance 308. Determination of the rise and fall times based at least in part on this reduced range may substantially eliminate marginal effects of the extreme values. The upper value 328 and the lower value 332 may be calculated upon determination of the high resistance 308 and the low resistance 316. In an embodiment, this measured settling time 324 may be qualified against a settling threshold value of an acceptance criteria. For example, the acceptance criteria may require the measured settling time 324<settling threshold value. The measured settling time 324 may additionally/alternatively be used as a data point for a subsequent analysis of settling drift.

In an embodiment, the rate of injection of VOC in chamber 108 may be faster than an expected settling time of a sensor in order to more accurately determine the settling time.

In some embodiments, the sensitivity of the response curve 320 may be determined through analysis of a ratio of the high resistance 308 to the low resistance 316. Taking the ratio of these values may account for the variability among sensors' absolute measurements. For example, different sensors may provide different output levels for the same amount of stimuli. These differences may not be very significant, as the output of the sensors will typically be calibrated to a control amount of stimuli present. Therefore, a sensitivity ratio may be a more reliable metric for determining sensitivity of sensors. Similar to the settling time, in an embodiment, the sensitivity ratio may be qualified against a sensitivity threshold value of the acceptance criteria. For example, the acceptance criteria may require the measured sensitivity ratio>sensitivity threshold value. The sensitivity ratio may additionally/alternatively be used as a data point for a subsequent analysis of sensitivity drift.

In various embodiments, qualification of the sensitivity ratio and/or the settling time 324 may be done at a beginning of an analysis period, at the end of the analysis period, and/or through one or more points during an analysis period.

In an embodiment, the response curve 320 may represent one iteration of an analysis that may be repeated a number of times. For example, in one embodiment, a response curve of the sensor 116 may be taken weekly for four consecutive weeks. In various embodiments, response curves may be taken at any frequency over any time period.

Figure 5:
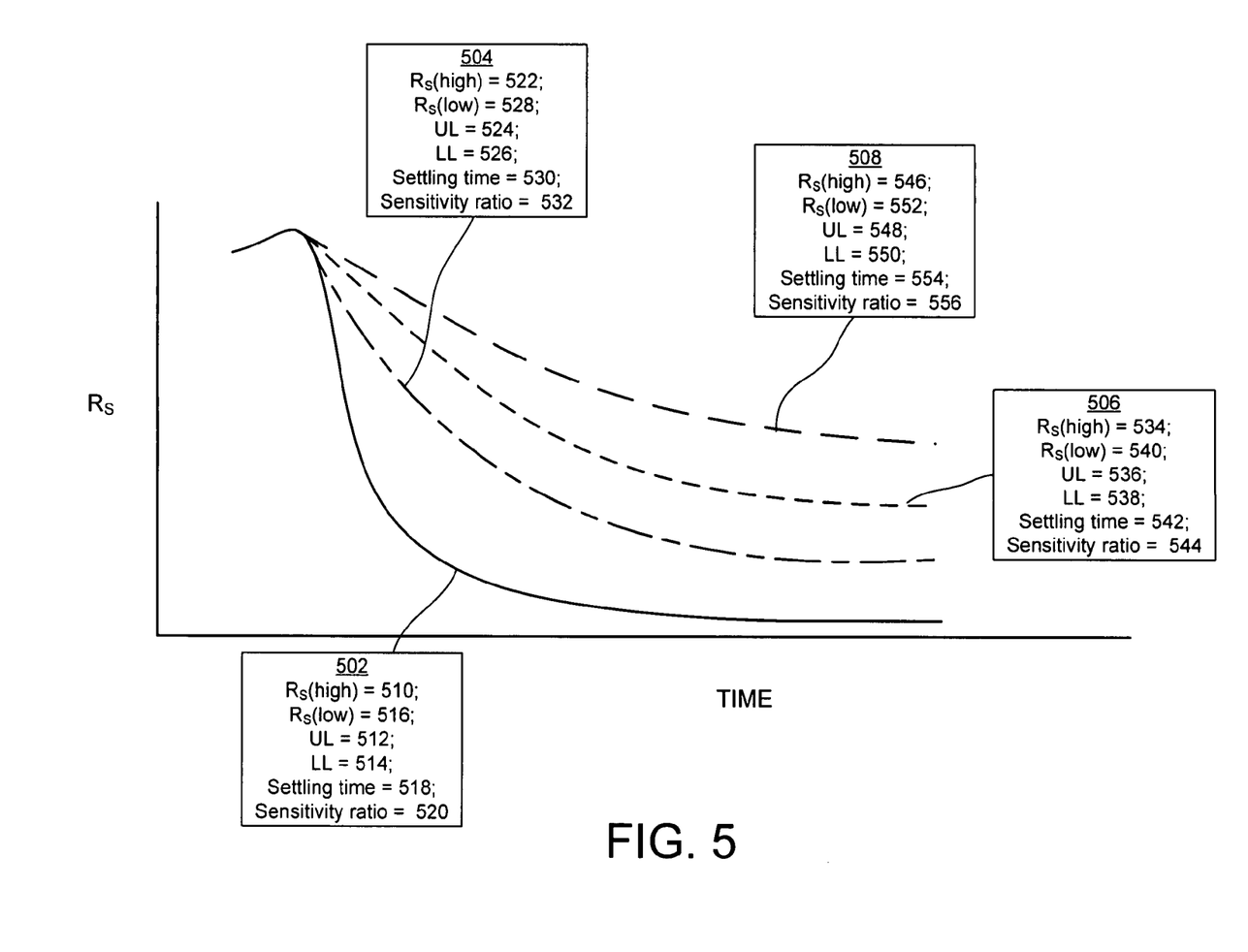
FIG. 5 illustrates a number of output signal curves recorded over a number of testing iterations in accordance with an embodiment of the present invention.

FIG. 5 illustrates a graph having four response curves overlaid with one another in accordance with an embodiment of the present invention. In this embodiment, curve 502 may represent an analysis performed in week 1; curve 504 may represent an analysis performed in week 2; curve 506 may represent an analysis performed in week 3; and curve 508 may represent an analysis performed in week 4.

Curve 502 may have a high resistance 510, an upper level 512, a lower level 514, a low resistance 516 and, through analysis of the previous values, a settling time 518 and a sensitivity ratio 520.

Curve 504 may have a high resistance 522, an upper level 524, a lower level 526, a low resistance 528 and, through analysis of the previous values, a settling time 530 and a sensitivity ratio 532.

Curve 506 may have a high resistance 534, an upper level 536, a lower level 538, a low resistance 540 and, through analysis of the previous values, a settling time 542 and a sensitivity ratio 544.

Curve 508 may have a high resistance 546, an upper level 548, a lower level 550, a low resistance 552 and, through analysis of the previous values, a settling time 554 and a sensitivity ratio 556.

As illustrated in FIG. 5, curves 502, 504, 506, and 508 have been normalized such that the high resistances 510, 522, 534, and 546, respectively, are at the same point. This may be done to more clearly illustrate drift characteristics of the subsequent VOC cycling.

Figure 6:
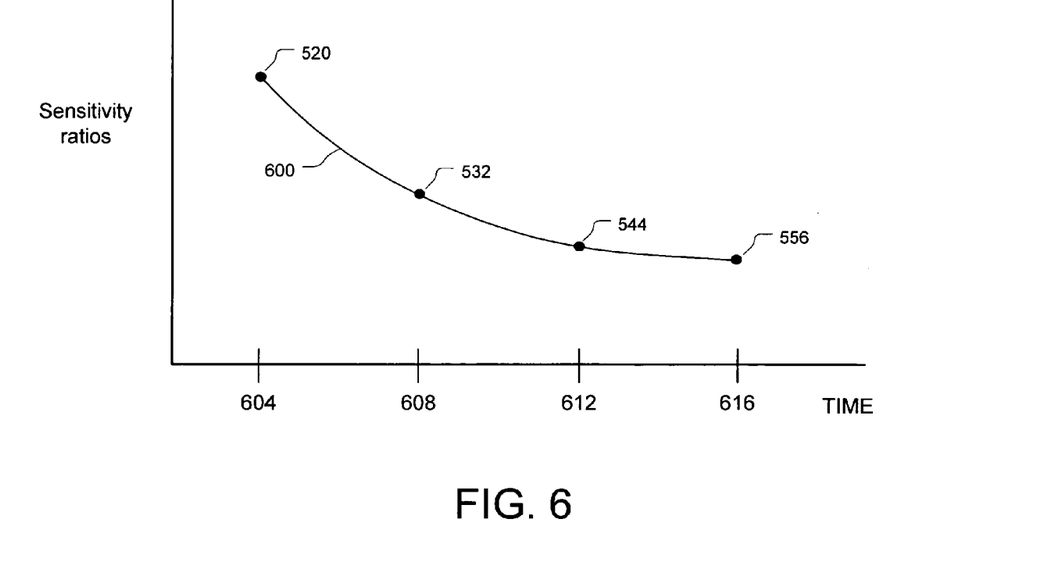
FIG. 6 illustrates a graph of a sensitivity drift curve in accordance with an embodiment of the present invention.

FIG. 6 illustrates a graph of a sensitivity drift curve 600, in accordance with an embodiment of the present invention. In this embodiment, the plotting of the sensitivity ratios 520, 532, 544, and 556 taken at respective data capture periods 604, 608, 612 and 616, e.g., weeks 1, 2, 3 and 4, respectively, may result in the sensitivity drift curve 600. It may be noted that the sensitivity drift curve 600 may decrease in a non-linear manner with the steeper part of the curve 600 being located towards the first interval 604.

Figure 7:
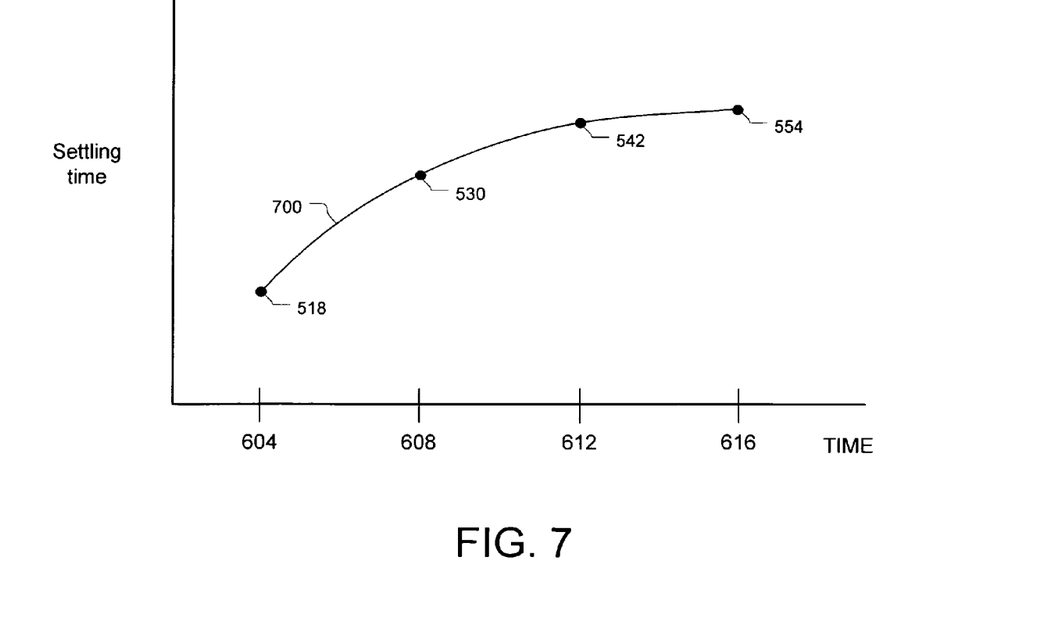
FIG. 7 illustrates a graph of a settling drift curve in accordance with an embodiment of the present invention.

FIG. 7 illustrates a graph of a settling drift curve 700 in accordance with an embodiment of the present embodiment. In this embodiment, the plotting of the settling times 518, 530, 542 and 554 taken at respective data capture periods 604, 608, 612 and 616 may result in the settling drift curve 700. Similar to the sensitivity drift curve 600, the settling drift curve 700 may be a non-linear function that is steeper towards the first interval 604; however, the settling drift curve may be increasing as opposed to decreasing.

Figure 8:
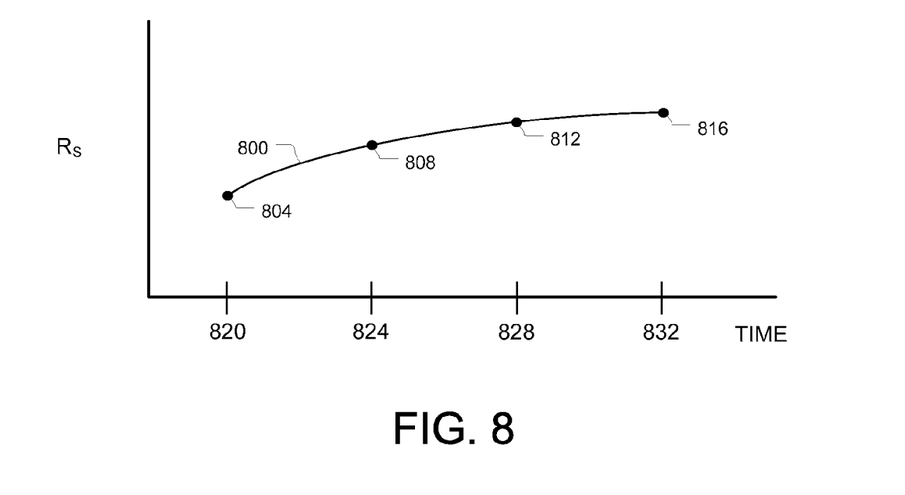
FIG. 8 illustrates a graph of an output drift curve in accordance with an embodiment of the present invention.

While the above data is retrieved from the sensor 116 over periods where the chamber 104 is cycled through a high and low VOC concentration; other embodiments, may additionally/alternatively focus on other data. For example, FIG. 8 illustrates a graph of an output drift curve 800 in accordance with an embodiment of the present invention. In this embodiment resistance $R_S$ measurements 804, 808, 812, and 816 may be recorded at data capture periods 820, 824, 828, and 832, respectively. In an embodiment, periods 820, 824, 828, and 832 may all occur when the VOC level in the chamber 104 is approximately the same. For example, these periods 820, 824, 828, and 832 may occur at a time when VOC levels are at a relatively low level between the periods 604, 608, 612 and 616 discussed above. Examination of this data may facilitate a determination of whether the sensor 116's output measurements are drifting at the end of the analysis period. While FIG. 8 illustrates that the measurements are drifting upwards over time, other embodiments may have sensor output drift downward.

The drift curves 600, 700, and/or 800 may prove to be valuable indicators of the performance of sensors in the field. For example, analysis of the drift curves 600, 700 and/or 800 may reveal that the sensor 116, at four weeks, is still experiencing substantial drift in one or more areas. If the sensor 116 was still experiencing substantial drift when it is calibrated for field deployment, the accuracy of the calibration may only last a limited time. On the other hand, analysis of the drift curves 600, 700, and/or 800 may reveal that the sensor 116 has already experienced the majority of its drift. Therefore, a calibration may be performed and the sensor 116 may be implemented in the field with a certain amount of assurance that drift will not compromise the data received from the sensor 116.

In an embodiment, after an analysis period, e.g., after interval 616, one or more of the drift curves 600, 700 and 800 may be compared to predetermined acceptance criteria to determine acceptability of the sensor. In various embodiments, the acceptance criteria may be an absolute value (e.g., the relevant drift curve must have a slope no greater than X); and/or a relative value (e.g., the relevant drift curve must have a slope within the Xth percentile of like sensors). As mentioned above, the acceptance criteria may also include other, non-drift, performance metrics, e.g., an acceptable sensor may be required to have a certain max/min ratio.

In various embodiments, sensors that do not conform to the acceptance criteria may be dealt with in a variety of ways. In some embodiments, a non-conforming sensor may be subjected to an extended analysis period to determine if the particular drift characteristic may level-off. In some embodiments, a non-conforming sensor, after one or more analysis periods, may be rejected. Additionally, levels and/or types of non-conforming sensors may be handled in accordance with the factors of a particular embodiment.

While each of the drift curves 600, 700 and 800 are based on the same number of measurements taken over substantially the same time period, in other embodiments the number of measurements and/or time period may be varied for one or more of the drift curves 600, 700 and/or 800.

Figure 9:
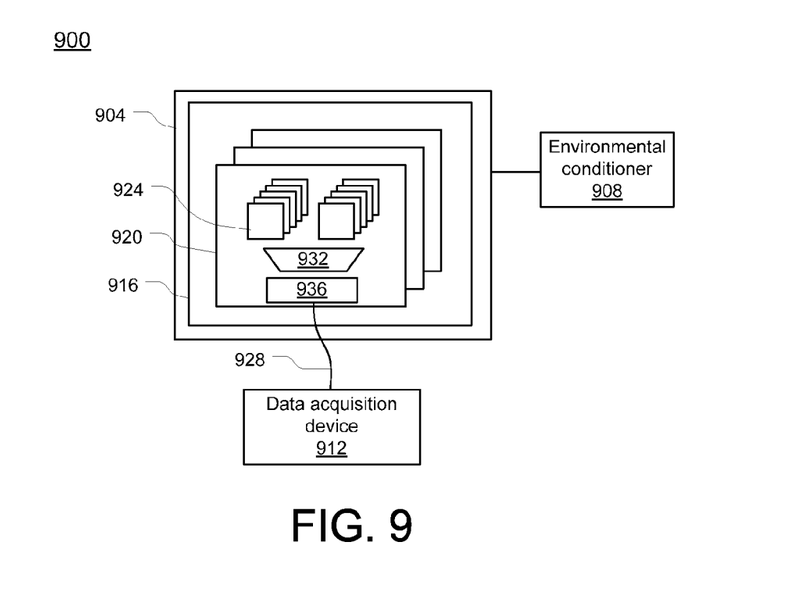
FIG. 9 illustrates a testing facility having a sensor platform in accordance with an embodiment of the present invention.

FIG. 9 illustrates a testing facility 900 in accordance with an embodiment of the present invention. In this embodiment, the testing facility 900 may include a chamber 904, an environmental conditioner 908 and a data acquisition device 912, which may be similar to, and substantially interchangeable with, like-named elements described with reference to FIG. 1. In this embodiment, the testing facility 900 may include a sensor platform 916, which may include one or more boards 920 adapted to receive up to a plurality of sensors 924. In some embodiments, the boards 920 may include sockets to receive the sensors 924 in a removable manner.

The boards 920 may have circuitry to communicatively couple the data acquisition device 912 to each of the sensors 924 coupled to the board(s) 920 via a communication link 928. In this embodiment, the data acquisition device 912 may sequentially select the particular sensor (or socket) through a selection mechanism 932, e.g., a multiplexer/demultiplexor, for recordation of the output signal.

In an embodiment having sensors 924 with a heater resistor and sensor resistor, similar to sensor 116 in the embodiment depicted by FIG. 2, the sensor platform 916 may apply a continuous voltage to the heater resistor to effectuate exhibition of the drift characteristics and selectively apply a voltage (and an additional load resistance) to the sensor resistor for recordation of the output signal.

In an embodiment, the sensor platform 916 may include a signal converter 936 coupled to the selection mechanism 932. The signal converter 936 may include, e.g., an analog-to-digital converter (ADC), and may be embedded into one of the boards 920. The signal converter 936 may facilitate the conversion of the voltage levels output from a particular sensor into a digital value for recordation and/or further processing by the data acquisition device 912. In various embodiments, the signal converter 936 may be located in the data acquisition device 912 or in a separate device.

In various embodiments, the communication link 928 may provide a conduit for communicating data (including requests for data) from the data acquisition device 912 to the sensor platform 916 and from the sensor platform 916 to the data acquisition device 912. For example, in an embodiment there may be, e.g., up to eight boards 920, each adapted to receive up to, e.g., 100 sensors 924. In this embodiment, the communication link 928 may include a parallel port cable or a universal serial bus (USB) to supply a 10-bit address to select a particular sensor. Seven bits may be used for sensor selection while three additional bits may select a specific board. If, e.g., a 12-bit address were to be used, either the number of sensors 924 per board or the number of boards 920 may be higher, or any combination thereof. Furthermore, in accordance with some embodiments, the communication link 928 may additionally/alternatively include connections to supply the signal converter 936 with a clock signal and/or a data-out connection. In various embodiments, the sensor platform 916 may provide relative acceptance criteria for a particular sensor by comparing the output signal to an average of the plurality of sensors 924. These acceptance criteria may account for the probabilities that the majority of the sensors 924 will be in compliance with performance requirements, with only a relatively small number of non-compliant sensors. In some embodiments, relative acceptance criteria may be additionally qualified by other predetermined criteria. For example, use of an average of the plurality of sensors 924 as relative acceptance criteria may be contingent on the average being greater than a certain value. This may account for the possibility of a bad batch of sensors.

In some embodiments, the sensor platform 916 may provide for batch processing of a large number of sensors 924 which may facilitate homogeneous testing conditions as well as allowing for the simultaneous testing of the sensors 924 in a relatively compact chamber 904.

Furthermore, in various embodiments, the sensor platform 916 may be utilized to facilitate the calibrating of the plurality of sensors 924. Calibration of the sensors 924 may be controlled by the data acquisition device 912, e.g., by the computation of calibration coefficients based, at least in part, on data captured through the drift analysis. An operator may therefore determine compliance of the sensors 924 and/or calibrate the sensors 924 prior to placement of the sensors in monitors or other field implementing device.

Referring again to FIG. 1, in some embodiments the output signal may be processed by the data acquisition device 112 in a manner to emulate an actual sensor implementation. This may facilitate, for example, a drift analysis being performed with reference to values that may be seen in an actual sensor implementation.

Although the present invention has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This description is intended to be regarded as illustrative instead of restrictive on embodiments of the present invention.

What is claimed is:

1. A system comprising:
    a sensor platform to receive a sensor and to measure drift characteristics that quantify a change from a first response of the sensor, to a first stimuli at a first time period, to a second response of the sensor, to a second stimuli at a second time period, the first stimuli being at least approximately equal to the second stimuli; and
    a data acquisition device coupled to the sensor platform to receive the measured drift characteristics of the sensor, to compare the measured drift characteristics to acceptance criteria, to determine acceptability of the sensor based at least in part on said comparing of the measured drift characteristics to acceptance criteria.

2. The system of claim 1, wherein the sensor is a first sensor and the sensor platform is to simultaneously receive a plurality of sensors including the first sensor, and to measure the drift characteristics of the plurality of sensors.

3. The system of claim 2, wherein the data acquisition device is to compare the measured drift characteristics of the first sensor to acceptance criteria based at least in part on the measured drift characteristics of the plurality of sensors.

4. The system of claim 2, wherein the sensor platform further comprises:
    one or more boards having a plurality of sockets configured to receive the plurality of sensors.

5. The system of claim 4, further comprising:
    a sensor platform to simultaneously receive a plurality of sensor and to measure drift characteristics of the plurality of sensors over a time period;
    a data acquisition device coupled to the sensor platform to receive the measured drift characteristics of the plurality of sensors, to compare the measured drift characteristics to acceptance criteria, and to determine acceptability of the plurality of sensors based at least in part on said comparing of the measured drift characteristics to acceptance criteria; and
    a signal converter to receive output from the plurality of the sensors in a first format and to convert the received output to a second format.

6. The system of claim 5, wherein the sensor platform further comprises:
    one or more boards having a plurality of sockets configured to receive the plurality of sensors; and
    a selection mechanism to selectively couple output received by each of the plurality of sockets to the signal converter.

7. The system of claim 5, wherein the data acquisition device is to compare the measured drift characteristics of the first sensor to acceptance criteria based at least in part on the measured drift characteristics of the plurality of sensors.

8. The system of claim 1, wherein the drift characteristics include at least sensitivity drift, settling drift, and/or output drift.

9. The system of claim 8, wherein the drift characteristics include at least sensitivity drift and settling drift.

10. The system of claim 1, wherein the data acquisition device is to calibrate the sensor based at least in part on the measured drift characteristics.

* * * * *